United States Patent [19]
Wenger

[11] Patent Number: 5,667,229
[45] Date of Patent: Sep. 16, 1997

[54] TOBOGGAN WITH RUNNERS

[75] Inventor: Peter Wenger, Baltschieder, Switzerland

[73] Assignee: Lemiteg Lebensmittel - und Freizeittechnik GmbH, Neuhausen, Germany

[21] Appl. No.: 351,446

[22] PCT Filed: Apr. 8, 1993

[86] PCT No.: PCT/CH93/00094

§ 371 Date: Apr. 21, 1995

§ 102(e) Date: Apr. 21, 1995

[87] PCT Pub. No.: WO94/23983

PCT Pub. Date: Oct. 27, 1994

[51] Int. Cl.[6] .............................. B62B 13/12; B62B 13/14
[52] U.S. Cl. ........................ 280/22; 188/8; 280/28.11
[58] Field of Search ................... 280/22, 21.1, 22.1, 280/28.11; 188/5, 8

[56] References Cited

U.S. PATENT DOCUMENTS

| | | | |
|---|---|---|---|
| 1,244,460 | 10/1917 | Blaszczyk | 188/8 |
| 1,444,175 | 2/1923 | Eronen | 280/22 X |
| 1,658,490 | 2/1928 | Lorusso | 280/22 |
| 1,745,452 | 2/1930 | Reed | 280/22 |
| 2,006,328 | 6/1935 | Scholtes | 280/22 |
| 2,247,033 | 6/1941 | Oermann et al. | 280/22 |
| 2,353,501 | 7/1944 | Redling | 188/8 X |
| 3,498,627 | 3/1970 | Pfeifer | 280/22 |
| 3,519,284 | 7/1970 | Toki | . |
| 3,858,898 | 1/1975 | Pfeifer | 280/22 |
| 3,909,024 | 9/1975 | Salomon | 280/605 |

FOREIGN PATENT DOCUMENTS

| | | | |
|---|---|---|---|
| 696353 | 9/1940 | Germany | 280/22 |
| 3606656 | 9/1987 | Germany | . |
| 25881 | 11/1910 | United Kingdom | 280/22 |

*Primary Examiner*—Brian L. Johnson
*Assistant Examiner*—Michael Mar
*Attorney, Agent, or Firm*—Dvorak & Orum

[57] ABSTRACT

The toboggan proposed has a device which adjusts the runner to allow the toboggan to negotiate curves, the adjustment being made by means of a steering member in such a way that the radius of curvature of the runners is the same as the radius of the curve to be negotiated. The toboggan may be stopped by an automatic braking member when the steering member is not pulled rearwardly or restrained by the operator of the toboggan.

6 Claims, 2 Drawing Sheets

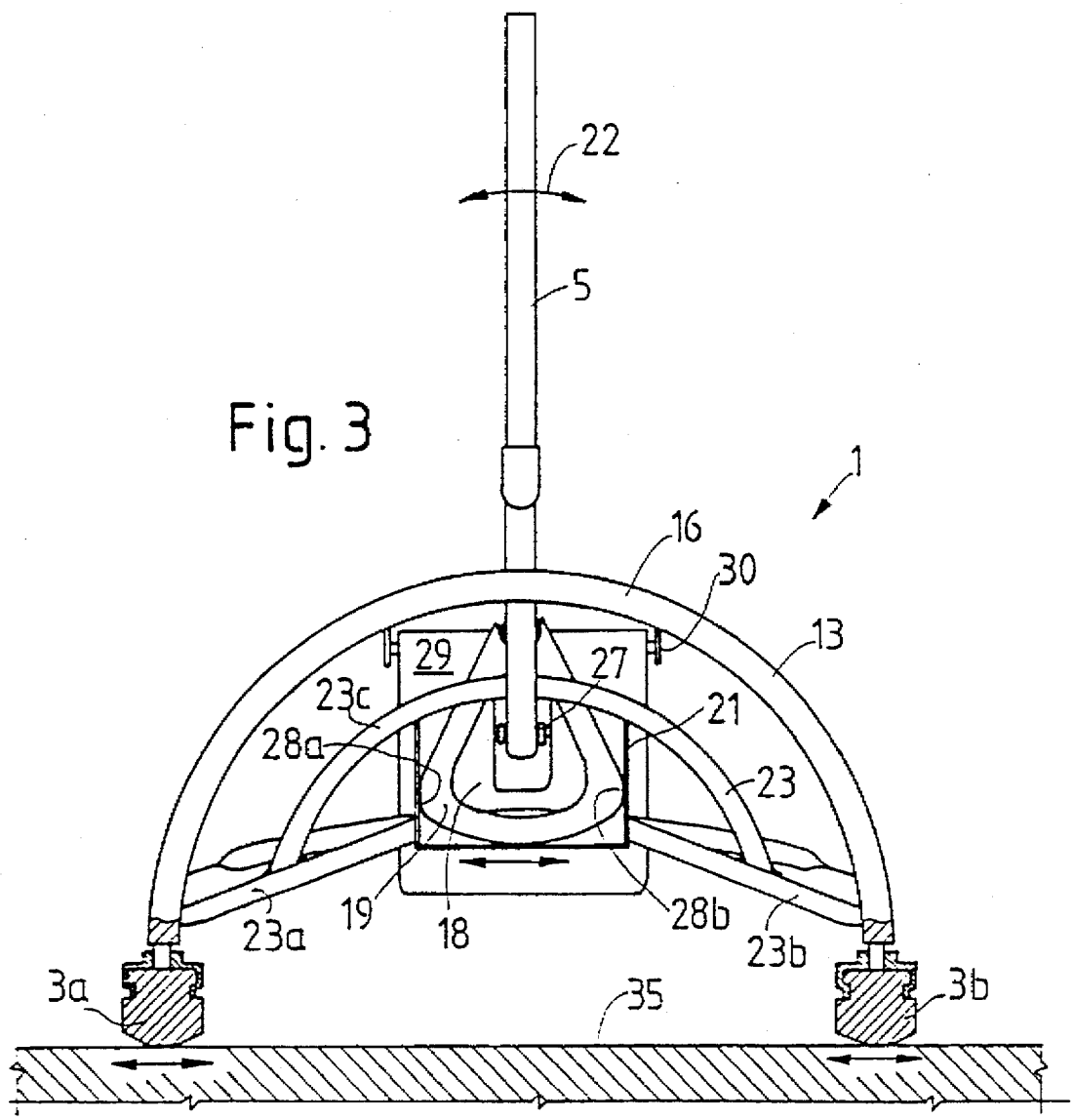

TOBOGGAN WITH RUNNERS

BACKGROUND OF THE INVENTION

1. Field of the Invention

This invention relates to a sled with runners. Sleds are used for sliding on low-friction ground, particularly on a blanket of firm snow. To steer the prior art sleds, the driver forces his or her shoe or boot against the runway for the sled so as to brake the sled and to pull it toward the side on which it is braked.

2. Description of the Prior Art

Sleds are known having runners which are divided in the longitudinal direction and in which the front pair of runners can be pivotally moved laterally outwardly by steering means. In that case the sled will travel in the direction in which the leading ends of the pair of runners which have been deflected are directed.

SUMMARY OF THE INVENTION

The known modes of steering have the disadvantage that kinetic energy of the sled will be dissipated for steering so that the velocity of the sled will be decreased although this is not intended. With pivoted runner sections the energy loss is caused by the lateral slipping of the pair of trailing runners.

It is an object of the invention to provide a sled which can be steered almost without a loss of kinetic energy.

As a result of the deformation of the runners for cornering, the entire sliding surface of the sled is approximately adapted to the radius of the corner to be turned. The adaptation is almost perfect when each runner is pivoted at its front or rear end to the body of the sled, one of the hinges of each of the two sets of hinges is slidable along the runner, and the force for bending each runner acts on the runner approximately at its center at right angles to the direction of travel and parallel to the surface of the runway for the sled. Because the deflection of the resilient runners consists of an elastic deformation over a distance which is small relative to the length of the runner, that deflection will be in first approximation a circular deformation so that it will ideally correspond to the radius of the corner to be turned.

If the runners are of a sufficient length, they may be mounted in the hinges to be non-displaceable in the longitudinal direction. In that case, the lateral bending of the runner will no longer be ideal for the generation of the radius of the corner but will still be sufficient for steering the sled with a low loss of kinetic energy.

The deflection of the runners is preferably effected with a pivoted lever. The lever, which protrudes over the top surface of the sled, can be conveniently actuated. In a preferred embodiment, the pivotable lever is coupled to a spring-biased braking means so that the release of the pivotable lever will cause a braking member between the runners to be forced down against the snow to effect an automatic braking. The pivotable lever, due to it projecting vertically upward acts as a further automatic braking element on the snow surface when the sled turns over.

BRIEF DESCRIPTION OF THE DRAWINGS

An example of the sled in accordance with the invention will now be explained in more detail with reference to the drawings.

FIG. 3 is a front elevation showing the sled viewed in the direction designated III in FIG. 2 with the runners of the sled shown in section.

DETAILED DESCRIPTION OF THE INVENTION

Figure 1:
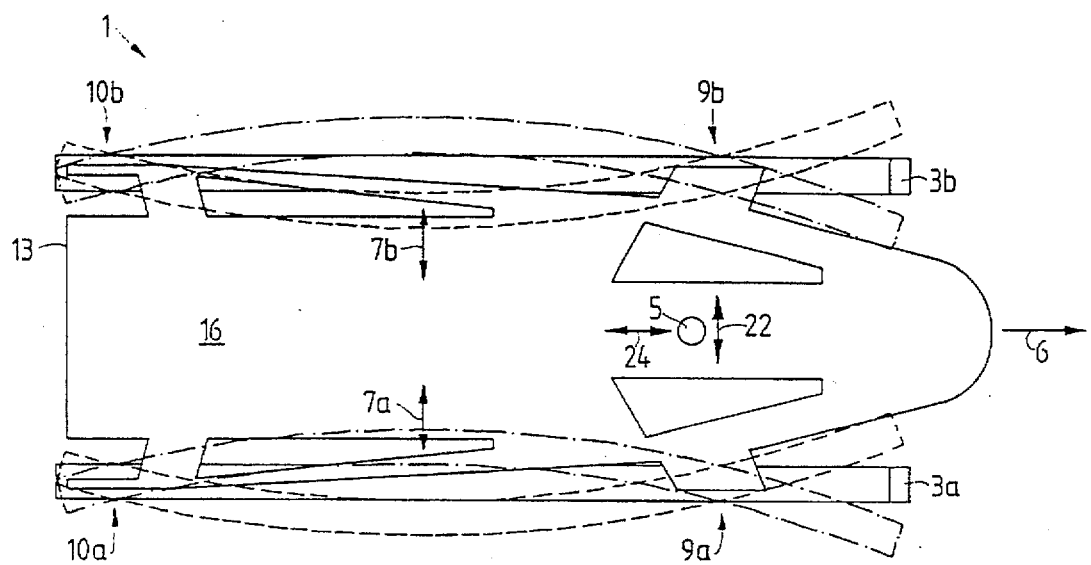
FIG. 1 is a functional representation of the operation by which the sled is steered.
Figure 2:
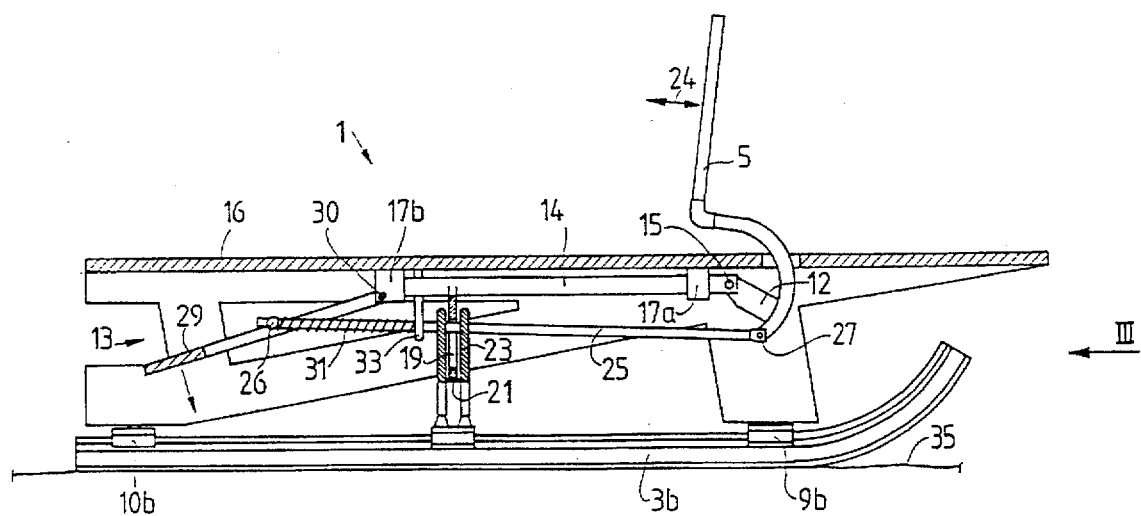
FIG. 2 is a longitudinal sectional view showing the sled.

FIG. 1 illustrates the operation by which a sled 1 is steered which comprises laterally disposed left-hand and right-hand resilient runners 3a and 3b. A pivotable lever 5 is provided in the forward portion of the sled 1 and protrudes over the seat 16 of the sled. The pivotable lever 5 exerts, by means of a force-transmitting unit shown in FIGS. 2 and 3, a force 7a and 7b, at right angles to the direction of travel 6 of the sled and parallel to the plane in which the runners 3a and 3b are sliding on the runners hinges 9a/9b and 10a/10b mounted on the body of 13 of the sled. In FIG. 1 the extent to which the runners 3a and 3b can be laterally deflected is greatly exaggerated. Because the actual lateral deflection of the runners during a cornering of the sled is small relative to the length of the runner between the two hinges 9a/9b and 10a/10b, the runners will be deflected in circular shape in accordance with the radius of the corner to be turned.

The pivotable lever 5 is pivoted by means of a flange 12 which acts as a lever arm. The flage 12 is attached to a hinge 15 which is provided at the end of a shaft 14. The shaft 14 is parallel to the longitudinal axis of the sled 1 and mounted to extend below the seat 16 of the sled. The pivotable lever 5 is pivotally movable in a direction which is parallel to the longitudinal axis of the sled. To turn the shaft 14, the pivotable lever 5 is pivotally moved to the left or right with respect to the longitudinal axis of the sled or perpendicular to the longitudinal axis of the sled. The shaft 14 is mounted on the body 13 of the sled by two bearings 17a and 17b. As shown in FIG. 3, a shaped member 19 having an aperture 18, is fixedly connected to and protrudes from the rear portion of the shaft 14. The shaped member 19 is resiliently clamped without a backlash in a U-shaped holder 21. The U-shaped holder 21, is connected to a linkage 23 which serves to transmit the force 7a and 7b for bending the runners and centrally engages the runners 3a and 3b. As a result, the deflecting forces 7a and 7b are transmitted from the pivotable lever 5 via the flange 12 and the hinge 15 as a rotary movement to the shaft 14 and from the shaft 14 via the shaped member 19, the U-shaped holder 21 and the linkage 23 to the middle of the runners 3a and 3b.

The hinge 15 is designed so that a pivotal movement 22 imparted to the pivotable lever 5 for steering the sled 1 will be converted with the smallest possible backlash to a rotary movement of the shaft 14. The pivotal movement of the shaped member 19 that is rigidly connected to the shaft 14 is transmitted to the U-shaped holder 21 owing to the shape of the shaped member 19. The mutually opposite curved portions 28a and 28b of the shaped member 19 lie against the legs of the holder 21 during the steering operation and are spaced the same distance apart throughout the pivotal movement because they constitute segments of a circle. Backlash is eliminated because the curved portions 28a and 28b of the shaped member 19 are resiliently clamped between the legs of the U-shaped holder 21. The elastic "clamping force" of the legs is so the curved portions 28a and 28b are resiliently pivotally movable within the holder 21 and due to uneven portions of the runway and are transmitted via the runners 3a and 3b and the linkage 23 to the holder 21 will not cause a gap to be formed between the shaped member 19 and the holder 21. The effects of jerks on selected that the clamped but are jerks which are the steering without a backlash are further reduced because the linkage comprises a bend 23a, which interconnects the linkage arms 23b and 23c which engage the runners 3a and 3b.

The portion of the pivotable lever 5 disposed below the seat 16 of the sled is spaced from the shaft 14 so as to act as a lever arm. A rod 25 is mounted on the pivotable lever 5 by a hinge 27 so that a forward and rearward pivotal movement 24 of the free end of the pivotable lever 5 will impart a linear forward and rearward movement to the rod 25. The other end of the rod 25 is mounted by means of a hinge 26 to approximately in the middle of a brake flap 29. The brake flap 29 is pivoted by a hinge 30 near the bearing 17b to be pivotally movable at right angles to the longitudinal axis of the sled. A tension spring 31 is fitted on the end of the rod 25 adjacent to the hinge 26. The other end of the tension spring 31 is secured to a flange 33, which is fixedly joined to the underside of the seat 16.

When the end of the pivoted lever is pulled back, the rod 25 will be pushed forward and the brake flap will be pivoted downward and forced against the runway 35 so as to brake the moving sled. When the pivotable lever 5 is not urged forward but unrestrained, the spring 31 for that purpose will automatically pull the brake flap 29 against the flange 33 in order to force the brake flap 29 down against the runway 35 for the sled and to pull back the pivoted lever 5 to an approximately vertical position. When unrestrained, the pivotable lever 5 will always return to a vertical position and force the brake flap 29 downward.

As is apparent from FIG. 3 the seat 16 is semicircular in cross-section in order to provide convenient and safe seating on the sled.

The brake flap 29 is pivotally movable only at right angles to the longitudinal axis of the sled. Although the brake flap 29 is connected to the pivotable lever 5, it does not move in unison with the pivotable lever 5 during a lateral pivotal movement 22. During a steering operation, the brake flap 29 will always remain in position so that it can brake with optimum effect. The slight twisting between the hinge 23, which due to the action of pivotable lever 5 is pivotally movable at right angles to the longitudinal axis of the sled, and the brake flap 29, which is pivotally movable only in the direction of travel, will be allowed by the rod 25 and the backlast in the bearings 26 and 27.

To permit reliable transportation of the sled 1 for example, on the roof of a car, the pivotable lever 5 can be pushed forward to lie on the top of the seat 16. In that case the brake flap 29 will lie against the underside of the seat 16 of the sled. Because the pivotable lever 5 can be pivotally moved as far as to the seat 16 of the sled, the driver of the sled 1 can "fall over" the seat of the sled for example, when the sled 1 is caught by an earth mound.

In other embodiments, the pivotable lever 5 may be replaced by different means, such as, for example, steering wheels, which may be circular or semi-circular or have different shapes, or pedals provided with deflected ropes for actuation by the feet.

I claim:

1. A steerable sled comprising a plurality of runners which are deformable by an adjusting means for steering the sled;

a user actuated steering member which acts on the adjusting means;

an automatic braking means which includes a braking member operatively connected to the steering member, the braking member being normally biased downwardly into a braking position for engagement with a runway for the sled and the braking member being movable to a raised non-braking position when the steering member is pulled by the user;

said adjusting means comprising a shaft upon which the steering member is mounted, lateral pivotal movement of the steering member by the user resulting in a rotary movement of the shaft, the shaft extending in the longitudinal direction of the sled and to which a first force-transmitting means is rigidly connected, which by means of a second force transmitting means, effects the lateral deformation of the two runners;

said second force-transmitting means further including a force-transmitting linkage which is connected to the runners and a resilient clamp by which the first force-transmitting means are resiliently clamped in such a manner that the first force-transmitting means can rotate in the clamp and will convert a rotary movement of the shaft to a linear movement of the force-transmitting linkage.

2. The sled of claim 1, further comprising:

a front and a rear portion of a body of the sled to which the runners are mounted on both sides of the sled;

a front and a rear hinge of each runner upon which the adjusting means laterally acts in such a manner that in dependence on the desired steering direction the runners are resiliently curved to one side or the other and the radius of curvature of the runners is adjustable to correspond to the radius of the corner to be turned by the sled in order to reduce the loss of kinetic energy.

3. The sled of claim 1, wherein the steering member, further comprises a pivoted lever which is connected to the adjusting means and is pivotally movable laterally with respect to the longitudinal axis of the sled to cause the runners to be deformed by the adjusting means.

4. The sled of claim 1, further comprising a force-transmitting means upon which the steering member acts for actuating the braking member.

5. The sled of claim 4, wherein the steering member further comprises a pivoted lever and a lever arm located at a distance from a hinge connecting the pivoted steering member to the shaft for exerting a force on the means for transmitting force to the braking member.

6. The sled of claim 1 wherein the steering member further comprises a pivotable lever mounted on the shaft, said lever being movable in the longitudinal direction of the sled between a non-braking position and a position in which the pivotable lever preferably completely rests on a seat of the sled.

* * * * *